United States Patent [19]
Petersen

[11] Patent Number: 5,351,501
[45] Date of Patent: Oct. 4, 1994

[54] METHOD OF TRANSFERRING HEAT ENERGY FROM A LOW TO A HIGHER TEMPERATURE

[76] Inventor: Benny Petersen, Ellehegnet 10, Vedbaek, Denmark, 2950

[21] Appl. No.: 965,395
[22] PCT Filed: Jun. 20, 1991
[86] PCT No.: PCT/DK91/00166
§ 371 Date: Dec. 17, 1992
§ 102(e) Date: Dec. 17, 1992
[87] PCT Pub. No.: WO91/19947
PCT Pub. Date: Dec. 26, 1991

[30] Foreign Application Priority Data
Jun. 20, 1990 [DK] Denmark .............. 1509/90

[51] Int. Cl.$^5$ .................................................. F24J 3/00
[52] U.S. Cl. .......................... 62/114; 62/268; 62/270; 62/402; 62/513; 126/247
[58] Field of Search ............ 62/114, 513, 402, 268, 62/270; 126/247

[56] References Cited
U.S. PATENT DOCUMENTS
4,707,996 11/1987 Vobach .................. 62/114

FOREIGN PATENT DOCUMENTS
023111G 1/1987 European Pat. Off. .

Primary Examiner—Albert W. Davis, Jr.
Attorney, Agent, or Firm—Darby & Darby

[57] ABSTRACT

A method is presented for the transfer of heat from a low to a higher temperature, in that the main medium in gas form is heated and compressed, after which this main medium is conducted to a first heating chamber (1) where heat at low temperature is added to the main medium, whereafter the gas is conducted to a compressor (8) and compressed, in that before being conducted to the first heating chamber (1), the main medium can undergo a pressure drop and a possible heat absorption in a heat exchanger. In the first heating chamber (1), there is added an auxiliary medium in liquid form which evaporates together with the heating of the main medium, so that after the heating the main medium is more or less saturated with the auxiliary medium in vapor form, in that the heat is added from a second heating chamber (2) in which a gaseous medium containing evaporated auxiliary medium is cooled for the condensation of the auxiliary medium. A third heating chamber (14) can be used for the transfer of heat to the first heating chamber (1).

15 Claims, 6 Drawing Sheets

METHOD OF TRANSFERRING HEAT ENERGY FROM A LOW TO A HIGHER TEMPERATURE

The invention relates to a method of transferring heat energy from a low to a higher temperature, by which method a main medium in gas form after a possible pressure reduction and possible normal heat absorption in a heat exchanger is conducted to a first heating chamber where heat at low temperature is added, after which the gas is compressed in a compressor.

The characteristic feature of the method according to the invention is that the main medium is rendered extra rich in energy by an extra exchange of heat which occurs prior to the compressor, where there is added an auxiliary medium in liquid form which evaporates simultaneously with the heating of the main medium, so that after heating the main medium is more or less saturated with the auxiliary medium in vapour form.

The process can be regulated by the addition of throttling or expansion, and therewith a reduction in the pressure of the main medium before it is conducted to the heating chamber. The result achieved hereby is that the main medium will be able to contain more auxiliary medium, and that the pressure after the subsequent compression will be able to be lower than would otherwise be the case.

It is well-known to produce cold cooler-water/icewater by moisturizing the air in an evaporator with vapour from the cooling water, after which the mixture is compressed, cooled to the surroundings and expanded back to the evaporator.

In the new process, there is here inserted a special heat exchanger where the moist air from the evaporator is heated and provided with a liquid auxiliary medium which evaporates before the air is conducted to the suction side of the compressor.

The energy for the special heat exchanger is obtained, for example, by the cooling and condensation of the main medium after the normal cooling, but before a possible throttling, expansion or other use.

It is well-known to be advantageous for the cooling and condensation of the compressed main medium to be carried out before the expansion, for example in a turbine, in that this reduces the possibility of damage to the expansion turbine. This cooling is seen carried out via heat exchange with the cold, expanding main medium, but never via heat exchange with the main medium before compression and never during the introduction and evaporation of an auxiliary medium.

It is known to carry out a corresponding heat pump process on a medium in gas form alone, but with the use of an auxiliary medium such as, for example, water, some important advantages are achieved. When a medium in gas form is used alone, quite large amounts of gas must be circulated because the heat capacity of a gas is small and, moreover, quite large heat transfer surfaces must be used because the heat transfer coefficients for gases are low. By utilizing an auxiliary medium, the main medium can contain considerably larger amounts of heat, while at the same time, when the auxiliary medium is for example water, the heat transfer coefficient becomes many times higher because the auxiliary medium exists in liquid form. Thus the costs of the heat exchangers can be considerably reduced, and the process has a higher degree of efficiency.

The method is particularly advantageous as a heat pump/refrigerator in connection with processes which nevertheless employ the compression of a gas. It is possible here, possibly with a modest increase in the compression work, to achieve a heat pump effect. The heat pumps which are used today are normally of the type which are based on CFC cooling agents. They have a high degree of efficiency, but at the same time also some disadvantages. Among other things, the disadvantages include the demand for a hermetically sealed construction, and environmental problems in relation to the ozone layer in the atmosphere. The present invention, on the other hand, can be an open construction without any environmental problems.

The method can be used in connection with the production of cold compressed air or gas/air mixture for the pressurecharging/turbocharging of engines.

An ordinary turbocharging results in a considerable increase in the temperature of the compressed air. Consequently, in order to achieve a greater filling of the engine, a subsequent cooling of the compressed air is carried out. This is an extra expenditure, partly because investments must be made in a heat exchanger, and partly because a cold cooling medium must be made available, for example cooling water.

By means of the invention, it is possible due to the heat pump process to deliver heat energy at a higher temperature, for example for other purposes, and at the same time achieve a greater cooling of the compressed air.

The method can be used in connection with the production of cold compressed air, for example for a machine tool.

Normally, in the production of compressed air for a tool, a cooling and drying of the air or a deep-freezing with a refrigeration plant is carried out, both in order to avoid the formation of condensate in pipelines and the tool. By means of the invention, due to the heat pump effect it is possible not only to deliver heat energy at a higher temperature and possibly to use the heat for heating purposes, but also to cool the air to a temperature at which no condensation occurs in the pipelines.

The invention can be used for the heating of a process by means of hot gas. An example here is a biogas reactor, where the process will be able to be heated by sending hot biogas into the reactor. With a suitable configuration, it will be capable of being combined so that a stirring is also achieved at the same time. Today, biogas reactors are heated by a heat source such as, for example, a gas boiler or district heating, and thus there is a considerable cost involved in heating. By means of the invention it is possible to utilize a heat source with a lower temperature, for example flue gas after normal flue-gas cooling.

The heat exchange in the heating and possibly the cooling can be effected by heat-transferring surfaces, but another method is to transfer heat to and from the auxiliary medium in liquid form. An efficient exchange of heat is achieved by circulating a suitable amount of auxiliary medium in liquid form, finely dispersed through a heat exchange chamber.

The method is well-suited for the cooling of a main medium of the same type as the medium which is heated, i.e. the main medium has an initial temperature which is more or less the same as the temperature after the heating in the first heating chamber, while at the same time the main medium is more or less saturated with the auxiliary medium. During the cooling, the auxiliary medium will condense, hereby giving off large amounts of energy.

If the main medium is expanded in an expansion machine before it is conducted into the heating chamber, the result is not only a drop in pressure but also a fall in the temperature, while at the same time energy is recovered. More heat energy will thus be able to be absorbed during the heating.

If the main medium after compression is first cooled in relation to the surroundings and thereafter cooled by delivering heat for the heating, the method can be used for the cooling of a compressed gas. The heat given off to the surroundings can be used, for example, for other heating purposes.

The main medium can possibly be subject to a further cooling by expansion of the main medium after the last cooling in an expansion machine, hereby recovering energy. In order to counteract further condensation of the auxiliary medium, a slight heating of the main medium can be effected after cooling and before a possible expansion. The heat for this heating can come, for example, from the gas just after compression or just after the heat exchange with the surroundings.

Since the main medium gives off more energy when cooled to the surroundings than the amount of energy which is added to the gas upon compression, the heat capacity flow on the cooling side will be less than that on the heating side. Therefore, more energy will be able to be added for the heating from another heat source. As a consequence of the heat pump principle, this heat energy will be delivered at a higher temperature upon heat exchange to the surroundings. The heat source can, for example, be flue gas after normal flue-gas cooling, when the flue gas still contains considerable amounts of water in vapour form, which condenses out during the cooling.

The method according to the invention will be described in more detail in the following with reference to the drawing, where the FIGS. 1-6 show various forms of implementation of the method. On the various drawings, the same parts have the same numbers.

Figure 1:
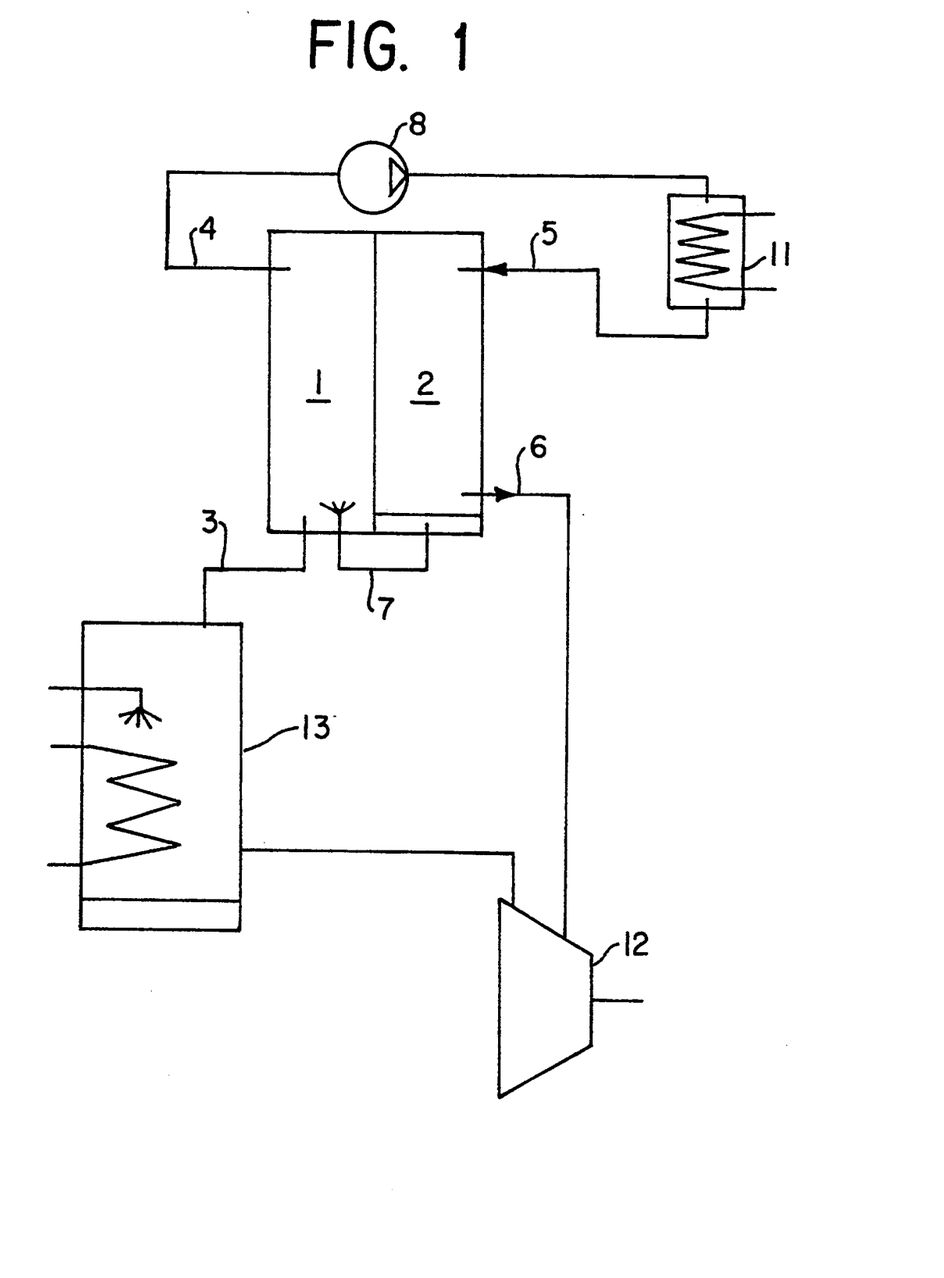
FIG. 1 shows the principle configuration of the method according to the invention, among other things for a closed circuit process.

FIG. 1 shows an arrangement for the utilization of the method according to the invention for a closed circuit process. The main medium is conducted through an inlet 3 into a first heating chamber 1, where at the same time there is added atomized auxiliary medium in liquid form through a pipe 7. During the heating of the main medium, the auxiliary medium evaporates so that the main medium is more or less saturated with the auxiliary medium after the heating, when it leaves the first heating chamber 1 through a pipe 4. The medium is hereafter compressed in a compressor 8. When the medium is hereafter cooled in a first heat exchanger 11 at the higher pressure, the auxiliary medium will be condensed out at a higher temperature, and the heat absorbed by evaporation of the auxiliary medium in the first heating chamber 1 will therefore be given off at a higher temperature than that at which it was absorbed. After cooling in the first heat exchanger 11, the main medium 5 is conducted into a second heating chamber 2 where it is cooled. Simultaneously with the cooling, a further condensation of the auxiliary medium will occur. Heat and possibly condensed auxiliary medium from the cooling is added to the heating process in the first heating chamber 1.

With the closed circuit process, the cooled medium 6 can be exposed to a pressure reduction, a throttling or an expansion in an expansion apparatus or chamber 12. With expansion, the main medium is cooled, whereby it is capable of absorbing heat from the surroundings in a heat exchange chamber or evaporator 13. This heat exchange can be effected by through-spraying with the auxiliary medium, which is hereby cooled. When the pressure is lowered by throttling, the auxiliary medium will be cooled due to evaporation. In certain cases, ice will be formed in the evaporator 13. As a whole, the process will be able to be used for the production of cooled auxiliary medium, for example water, for process purposes or for the production of effective heat during heat absorption, for example from water from the surroundings.

Figure 2:
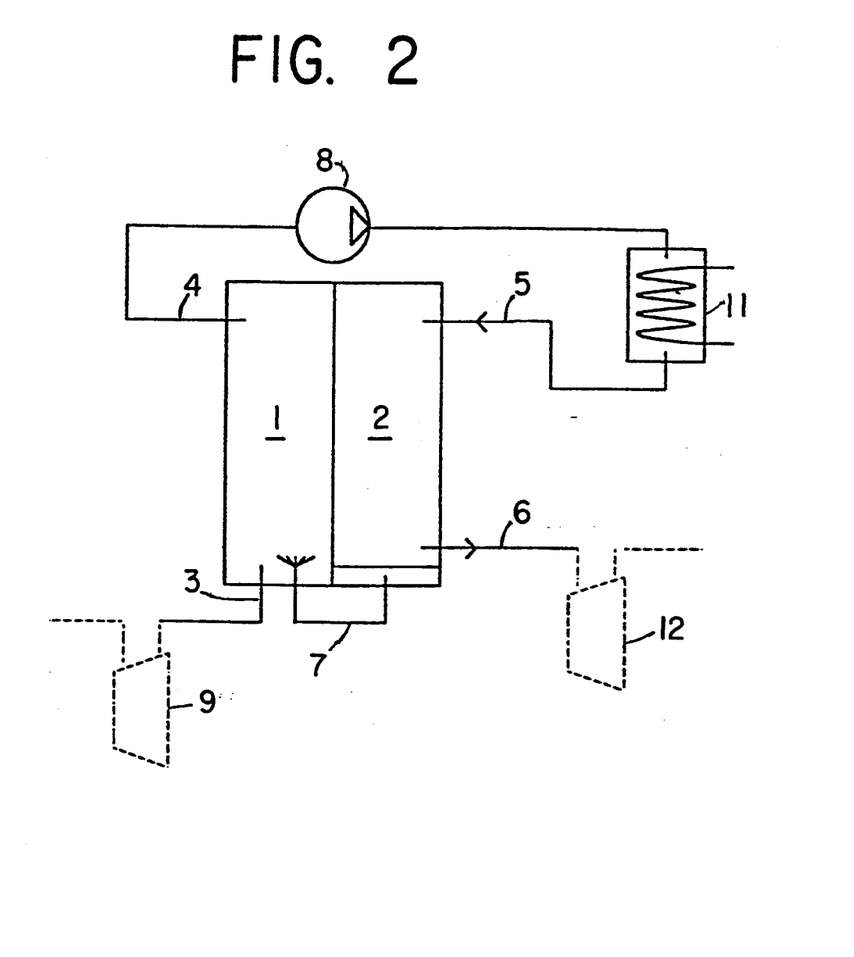
FIG. 2 shows the principle configuration of the method according to the invention in the production of cooled, compressed main medium, for example for the production of compressed air or the pressure-charging of engines.

FIG. 2 shows a version without evaporator 13 in order for the method according to the invention to be used for the production of compressed and cooled main medium. The main medium is fed via the inlet 3 to the first heating chamber 1, where it is moisturized and heated with the auxiliary medium. After the compression 8, the mixture is cooled in the first heat exchanger 11, whereby the auxiliary medium will normally start to condense. After cooling in this heat exchanger, the main medium is conducted through a pipe 5 into the second heating chamber 2 where it is cooled. A condensation of the auxiliary medium will occur at the same time as the cooling. Both heat and condensed auxiliary medium from the cooling are added to the heating process in the first heating chamber 1. This process will typically be able to be undertaken in connection with processes where a compression of the main medium is nevertheless carried out. The compressor 8 must perform slightly more work than otherwise, but on the other hand the compression heat is delivered at a higher temperature than is otherwise the case in the first heat exchanger 11, where it can possibly be used for other purposes. If it is desired to reduce the temperature of the main medium in addition to the cooling in the second heating chamber 2, this can be effected by carrying out an expansion 12 of the main medium 6 after the normal cooling.

If the method in FIG. 2 is used for the pressure-charging of piston engines, the main medium at the inlet 3 can be air or a mixture of air and gaseous fuel and the auxiliary medium water.

At low humidity, the temperature of the compressed air can be lower than the temperature of the inducted air at the inlet 3. An even lower temperature can be achieved by an expansion in an expansion apparatus or chamber 9 in the inlet 3 to the first heating chamber 1.

Figure 3:
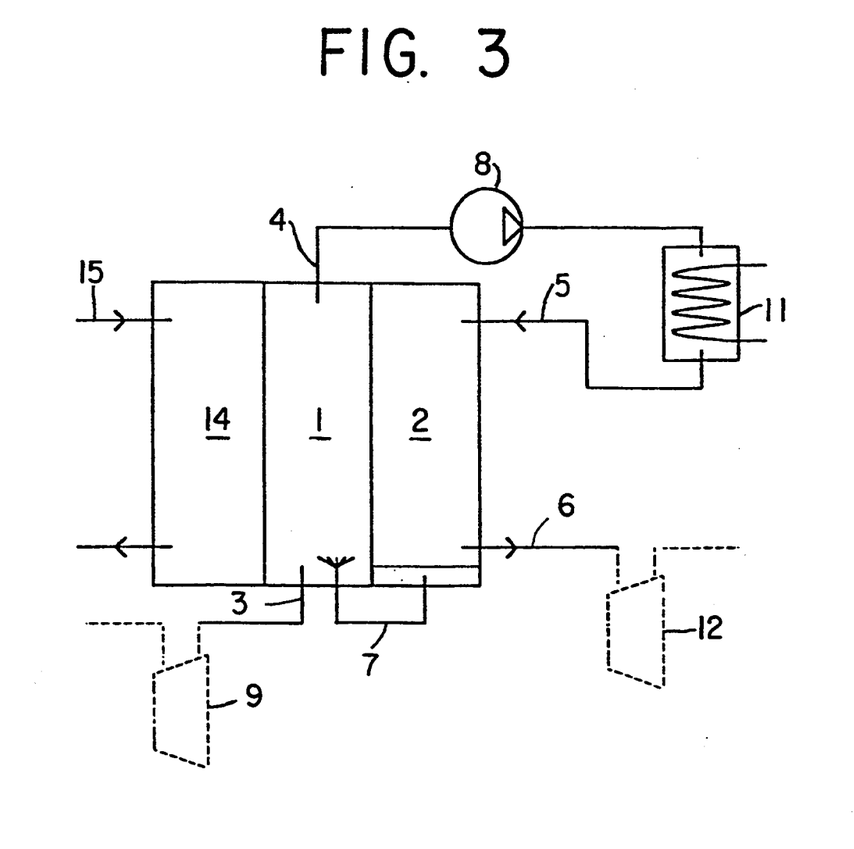
FIG. 3 shows a configuration of the method according to the invention which is used for the cooling of compressed main medium, where a heat source is added in parallel with the cooling of the main medium. This is particularly suitable for the pressure-charging of engines.

FIG. 3 shows another configuration which can be used, for example, for the pressure-charging of engines, where an extra heat source has been added for the heating of the main medium in the first heating chamber 1 before the compression. At the side of and normally parallel with the first heating chamber 1, there has been added a third heating chamber 14 into which an extra medium is introduced via an inlet 15, for example flue gas, which is cooled. The background for this extra heat source is that the amount of heat which is added from the cooling of the main medium in the second heating chamber 2 is less that the amount of heat which can be absorbed in the first heating chamber 1 during the heating. The heat pump principle of the method can therefore be used to recover heat from the extra medium, after which the heat is delivered at a higher temperature in the first heat exchanger 11. The extra amount of heat which can be absorbed in the first heating chamber 1 makes the invention suitable for process cooling, either by the exchange of heat with the extra medium or by circulation of the auxiliary medium in the first heating chamber 1.

The third heating chamber 14 can also be added to the closed heat pump process in FIG. 1 and most of the remaining configurations for the method according to the invention. The third heating chamber 14 can similarly be added between the first heating chamber 1 and the compressor 8.

Figure 4:
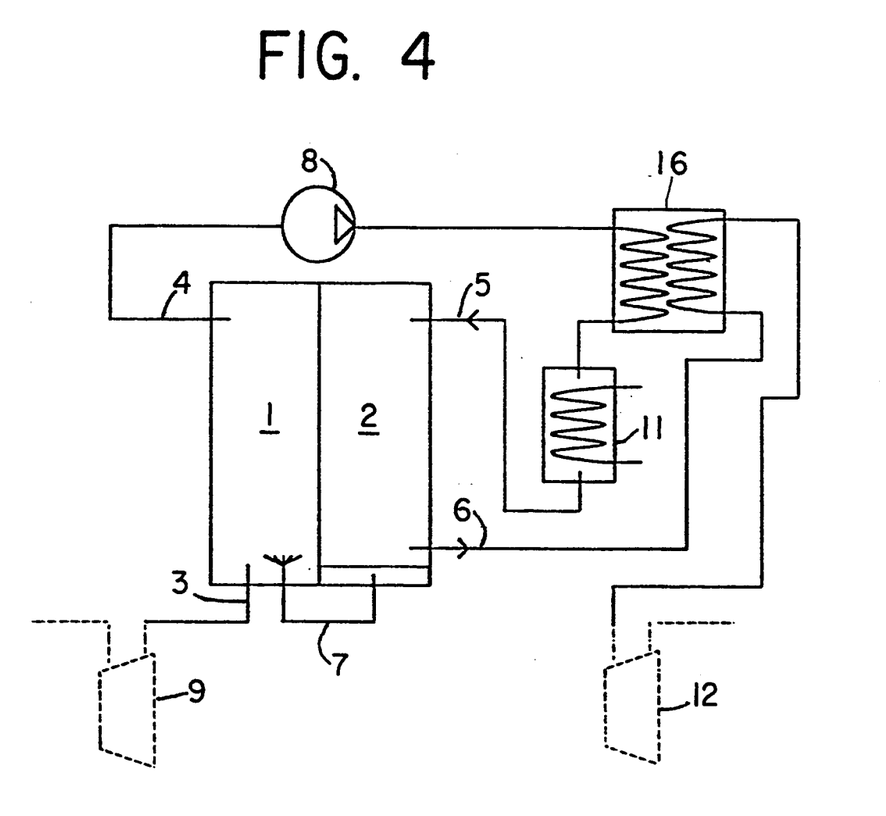
FIG. 4 shows a configuration of the method according to the invention in which the compressed and cooled main medium is given a slight re-heating.

FIG. 4 shows a configuration in which the main medium is subjected to a slight re-heating. This can be done partly to safeguard against the condensing out of remaining auxiliary medium due to further cooling of the main medium, for example during transport in distribution pipes, and partly to avoid the formation of condensate in the distribution pipes when the temperature at the outlet 6 is lower than the temperature of the surroundings. In FIG. 4, this is done by inserting yet another heat exchanger 16 after the cooling in the second heating chamber 2 before it is conducted further. Another solution will be to insert the heat exchanger 16 after the first heat exchanger 11, so that the gas after the compressor 8 is first cooled by the surroundings in the first heat exchanger 11 and then by the main medium.

Figure 5:
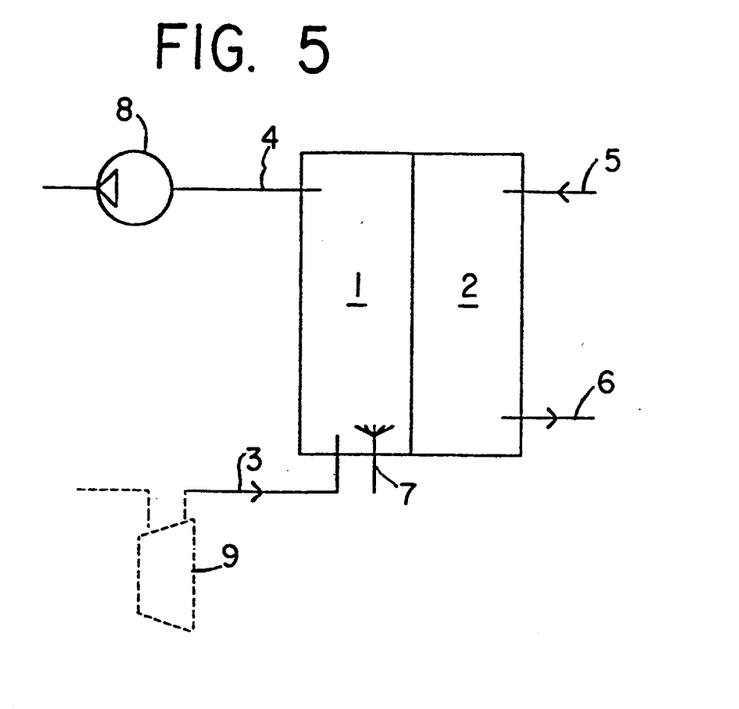
FIG. 5 shows the principle configuration of the core in the method according to the invention. This configuration can be used for the heating of, for example, a biogas reactor with energy-rich biogas.

In FIG. 5 the main medium is first conducted through the inlet 3 into the first heating chamber 1, where at the same time auxiliary medium in liquid form is added through the pipe 7, for example in atomized form. During the heating of the main medium, the auxiliary medium evaporates so that the main medium is more or less saturated with the auxiliary medium after the heating, when it leaves the first heating chamber 1 through the pipe 4. Hereafter, the main medium is compressed in the compressor 8. If the main medium is thereafter cooled at the higher pressure, the auxiliary medium will be condensed out at a higher temperature, and the heat absorbed by evaporation of the auxiliary medium in the first heating chamber 1 will thus be given off at a higher temperature than that at which it was absorbed. An extra medium is added through a pipe 5 to a second heating chamber 2, whereby the extra medium is cooled. The main medium can possibly be expanded before it is conducted into the first heating chamber 1. This can be effected, for example, by a throttle valve or by an expansion machine 9. With expansion, a lower pressure is achieved, and the main medium can therefore contain more auxiliary medium. If expansion is effected by means of an expansion machine, which performs work, a reduction in the temperature of the main medium can also be achieved.

The method in FIG. 5 is suitable, for example, for the heating and stirring of a biogas reactor. The main medium here is biogas to which, after a pressure reduction, water vapour is added by heating.

The medium, which is cooled, can be flue gas from a gas engine or boiler.

After the compression, the condensation temperature of the biogas is typically higher than the temperature in the reactor tank, wherefore the feeding back of the energy-rich biogas to the tank can serve to heat said biogas.

The pressurized biogas can also be used to achieve a stirring in the tank.

Figure 6:
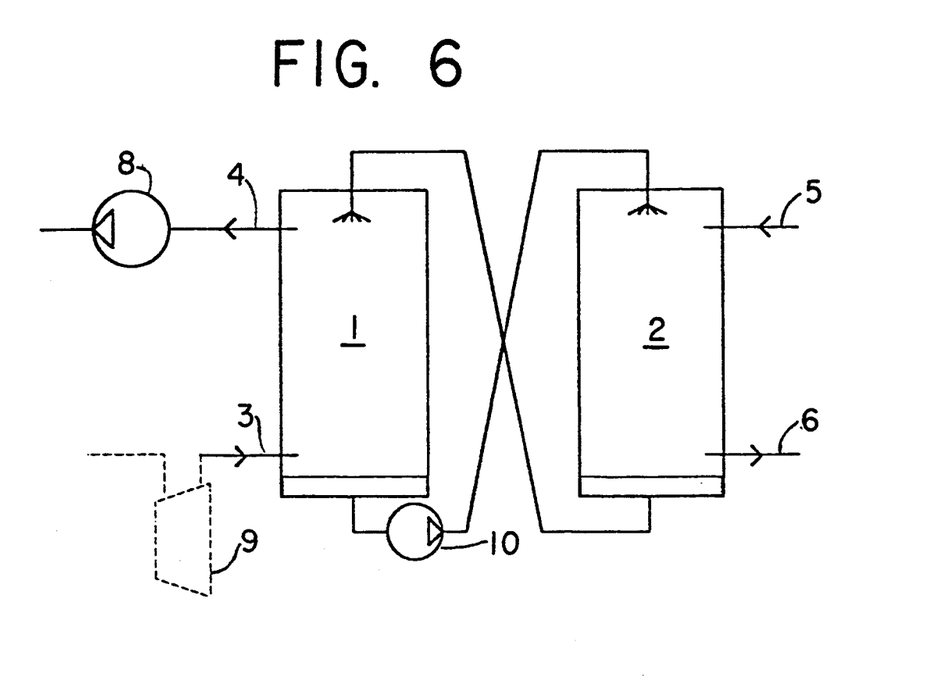
FIG. 6 shows the principle configuration of the method according to the invention, where the heat exchange takes place by means of the auxiliary medium.

In FIG. 6 is shown an arrangement which illustrates how the auxiliary medium can also function as heat-transferring medium. In both of the heating chambers 1, 2, the chamber is through-sprayed with auxiliary medium from the bottom of the opposite heating chamber. This is effected with a pipe arrangement 10 driven by one or two pumps. During the through-spraying, the auxiliary medium will respectively absorb and give off heat energy and therewith change temperature. The principle can also be used in other configurations, where the auxiliary medium exchanges heat directly with the surroundings.

I claim:

1. A method for transferring heat energy from a low to a high temperature comprising the steps of:
   providing a main medium in gas form to a first heating chamber;
   adding an auxiliary medium in liquid form to the main medium in said first heating chamber;
   adding heat at a low temperature to said main medium in said first heating chamber to also vaporize the auxiliary medium and saturate the main medium with the auxiliary medium vapor;
   compressing the saturated main medium from the outlet of the first heating chamber;
   performing a heat exchange of the output of the compressed saturated main medium, and
   cooling the output main medium from the compressor in a second heating chamber.

2. A method as in claim 1, further comprising the step of providing a third heating chamber and adding heat energy from said third heating chamber to the heating in the first heating chamber of the main medium to make the main medium hotter than it would become with the heat from the cooling of the main medium alone.

3. The method according to claim 2 wherein the auxiliary medium is water, and the medium in the second heating chamber or the third heating chamber is flue gas from a combustion process or another medium in gas form with an oxygen content which differs from that normally existing in air.

4. The method of claim 1, wherein the heat exchange step is effected at least in part by the transfer of heat between a main medium in gas form and an auxiliary medium in liquid form.

5. A method as in claim 4 further comprising the step of reducing the pressure of the output main medium from said second heating chamber.

6. A method as in claim 5, further comprising the step of evaporating the reduced pressure main medium and applying it back to said first heating chamber.

7. The method of claim 1, further comprising the step of expanding the main medium before it is applied to the first heating chamber to produce a fall in temperature or a pressure drop.

8. The method of claim 1 further comprising the step of reheating the main medium by heat exchange with the gas after the compression in the compressor after the main medium has been cooled in the second heating chamber.

9. The method of claim 1, wherein the auxiliary medium is water, and the medium in the second heating chamber is flue gas from a combustion process or another medium in gas form with an oxygen content which differs from that normally existing in air.

10. The method of claim 1 wherein the auxiliary medium is water and the main medium is ordinary air.

11. A method as in claim 1 further comprising the step of reducing the pressure of the output main medium from said second heating chamber.

12. A method as in claim 11 further comprising the step of reducing the pressure of the output main medium from said second heating chamber.

13. The method of claim 11 further comprising the step of applying the reduced pressure main medium back to said first heating chamber.

14. A method as in claim 1 wherein the heat exchange step releases heat to the ambient.

15. Apparatus for transferring heat energy from a low to a high temperature comprising:
a firsts heating chamber,
means for applying a main medium in gas form to said first heating chamber;
means for adding an auxiliary medium in liquid form to the main medium in said first heating chamber;
means for adding heat at a low temperature to said main medium in said first heating chamber to also vaporize the auxiliary medium and saturate the main medium with the auxiliary medium vapor,
means for compressing the saturated main medium from the output of said first heating chamber,
means for heat exchanging the compressed saturated main medium from said compressing means, and
a second heating chamber for cooling the output main medium from said compressing means.

* * * * *